US006890027B2

(12) United States Patent
Marie et al.

(10) Patent No.: US 6,890,027 B2
(45) Date of Patent: May 10, 2005

(54) ADJUSTABLE SEAT FOR MOTOR VEHICLE

(75) Inventors: Yvan Marie, Auvers Saint Georges (FR); Herve Pruvot, La Celle Saint Cloud (FR)

(73) Assignee: Renault, Boulogne Billancourt (FR)

( * ) Notice: Subject to any disclaimer, the term of this patent is extended or adjusted under 35 U.S.C. 154(b) by 0 days.

(21) Appl. No.: 10/148,403

(22) PCT Filed: Nov. 30, 2000

(86) PCT No.: PCT/FR00/03340

§ 371 (c)(1),
(2), (4) Date: Aug. 21, 2002

(87) PCT Pub. No.: WO01/40014

PCT Pub. Date: Jun. 7, 2001

(65) Prior Publication Data

US 2003/0075893 A1 Apr. 24, 2003

(30) Foreign Application Priority Data

Dec. 3, 1999 (FR) ............................. 99 15245

(51) Int. Cl.[7] ............................................. B60N 2/42
(52) U.S. Cl. ................................................... 297/216.1
(58) Field of Search ...................... 297/344.14, 344.15, 297/216.2, 216.19, 216.16, 216.1, 216.18

(56) References Cited

U.S. PATENT DOCUMENTS 3,463,543 A * 8/1969 Zeller ....................... 297/216.2
4,257,626 A * 3/1981 Adomeit ..................... 280/806
4,556,185 A * 12/1985 Takagi ......................... 248/421
4,767,157 A * 8/1988 Kazaoka et al. ............. 297/322
4,993,678 A * 2/1991 Easter ......................... 248/371
5,782,533 A * 7/1998 Fischer et al. .............. 297/338

FOREIGN PATENT DOCUMENTS

| DE | 71 40 022 | 1/1972 |
| DE | 25 27 047 | 1/1977 |
| EP | 0 857 606 | 8/1998 |

* cited by examiner

Primary Examiner—Milton Nelson, Jr.
(74) Attorney, Agent, or Firm—Oblon, Spivak, McClelland, Maier & Neustadt, P.C.

(57) ABSTRACT

An adjustable seat for a motor vehicle including a substantially horizontal seating element, on a rear part of which is articulated a back. An adjusting device adjusts the position of the seating element of the seat relative to the vehicle structure and locks and unlocks the adjusting device. A reinforcing device, separate from the adjusting device, absorbs at least part of the impact loads provoked by a longitudinal shock, in particular at the front of the vehicle so that, at the time of impact, the deformation of the adjusting device is reduced, thereby reducing the tilting movement, in particular forward, of the adjustable seat about a rocking axis with global transverse orientation.

13 Claims, 4 Drawing Sheets

ADJUSTABLE SEAT FOR MOTOR VEHICLE

The invention relates to a motor-vehicle seat.

Numerous types of motor-vehicle seats are known.

In general, a motor-vehicle seat is composed of a lower chassis, of a back and of a seating element.

The chassis is provided with two parallel longitudinal beams connected by two crossbeams.

On each longitudinal beam there is fixed a slide mounted to slide axially in a slideway of the vehicle floor in order to permit displacement of the seat from front to rear.

The seating element comprises a reinforced metal frame which supports a seating-element cushion.

The metal frame thereof is mounted pivotally on two pairs of adjusting couplers situated at the front and rear of each side of the metal frame, so as to form a deformable parallelogram together with the two longitudinal beams. Thus it is possible to adjust the position of the seat, and in particular the height thereof.

In addition, one of the joint axes of a pair of couplers can be translationally movable relative to its support, such a configuration allowing the inclination of the seating element of the seat to be adjusted.

The back comprises a reinforced metal frame which is provided with a back cushion.

The metal frame thereof is mounted via a joint around a horizontal axis carried by the metal frame of the seating element, to allow adjustment of the vertical inclination of the back.

The seating-element cushion and the back cushion are generally cloth-covered blocks of synthetic foam.

This type of seat suffers from several disadvantages.

A longitudinal shock such as an emergency stop or a collision causes large stresses in the seat. In fact, during a frontal impact, for example, the body of the passenger is projected toward the front but is restrained by the safety belt, especially at the level of the hips and shoulders, whereupon the impact causes forces directed toward the front and toward the floor of the vehicle as far as the seating element of the seat is concerned. Thus the pair of couplers situated at the front of the metal frame of the seating element is subjected to high compressive stresses, which cause elastic deformations. These deformations lead to general tilting of the seat toward the front and downward around a geometric tilt axis of generally transverse orientation.

If the deceleration is sufficiently violent, an inflatable airbag is deployed in front of the seat occupant, and the deformations of the adjusting couplers then reduce the efficacy thereof.

In fact, the head and chest of the passenger come into contact with the inflatable airbag at a position lower than the position of optimal contact, or in other words in the absence of forward tilting of the seat. The position becomes progressively lower with increasing violence of the impact, or in other words of the deceleration. Thus the efficacy of the inflatable airbag may be reduced even more as the violence of the impact becomes greater.

In addition, after the impact, the pair of front couplers returns almost to its initial condition, since the elastic deformation is elastic overall.

The deformation of the adjusting couplers is responsible for aggravation of injuries to the passenger.

To remedy this problem, the invention proposes, for a motor vehicle, an adjustable seat of the type provided with a substantially horizontal seating element, on the rear part of which there is mounted a back via a joint, a device for adjustment of the position of the seating element of the seat relative to the vehicle structure, and means for blocking and unblocking the adjusting device, characterized in that it is provided with reinforcing means which are separate from the adjusting device and which, during a longitudinal impact, especially at the front of the vehicle, absorb at least part of the collision forces caused by the impact, thus reducing the deformation of the adjusting device and thus reducing the tilting movement, especially toward the front, of the adjustable seat around a geometric tilt axis of generally transverse orientation.

According to other characteristics of the invention:

the reinforcing means are provided with at least one reinforcing leg, which is mounted to rotate via its first end around a transverse pivoting axis in the seating element of the seat, and which pivots around this transverse axis between an engaged reinforcing position, in which its second end cooperates with the vehicle structure, and a retracted position designed to permit adjustment of the position of the seating element;

the second end of the reinforcing leg cooperates with a notched element integral with the vehicle structure, in order to define the engaged position;

the reinforcing leg is restored elastically to engaged position;

the reinforcing leg is connected to a device for control of the pivoting of the reinforcing leg between its engaged and retracted positions;

the control device is provided with a bar connected to the reinforcing leg in a zone situated between the pivoting axis and the second end, and in that the displacement of the bar permits pivoting of the reinforcing leg around the pivoting axis, between its engaged position and its retracted position;

the control device is actuated by the means for blocking and unblocking the adjusting device;

during unblocking of the adjusting device, the reinforcing leg is in retracted position before the adjusting device is unblocked;

the device for adjustment of the position of the seating element of the seat comprises two front couplers and two rear couplers;

the pivoting axis of the upper end of the reinforcing leg is mounted in the front part of the seating element of the seat;

the reinforcing leg is mounted via a joint on a lateral element of the seating element of the seat of the vehicle;

that the reinforcing means are symmetric and in that they are provided with two reinforcing legs which are operated simultaneously.

Other characteristics and advantages of the invention will become apparent upon reading the detailed description hereinafter, which can be understood by referring to the attached drawings, wherein.

Figure 1:
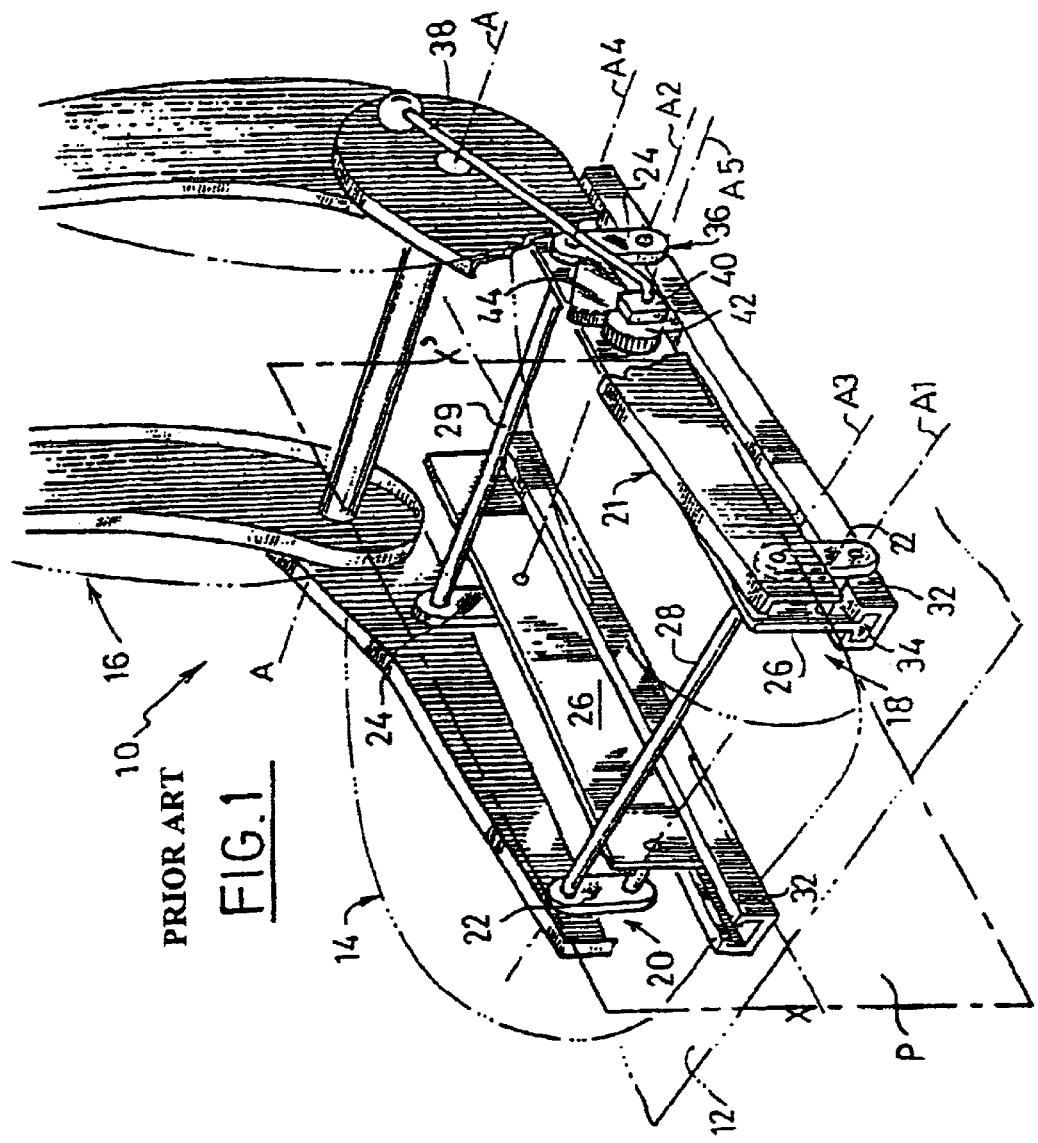
FIG. 1 is a perspective view illustrating a motor-vehicle seat equipped with adjusting means according to the prior art.

A seat 10 according to the prior art is illustrated in FIG. 1. It is mounted to slide from front to rear along a longitudinal displacement axis X–X' on floor 12 of a motor vehicle.

Throughout the description hereinafter, an orientation from front to rear will be used; it corresponds to the orientation from left to right in FIG. 3, which illustrates seat 10 viewed in profile.

With regard to FIG. 1, the front is located at "end X" of displacement axis X–X', and the rear is located at "end X'" of displacement axis X–X'.

The left and right of seat 10 relative to displacement axis X–X' are defined for the observer looking toward "end X".

Seat 10 has a symmetry plane P, which contains displacement axis X–X' and which is perpendicular to floor 12.

Seat 10 is provided with an element 14, referred to as a seating element, a back 16, and two structural elements, 18 on the left and 20 on the right.

Back 16 is mounted to rotate around a horizontal axis A situated to the rear of seating element 14.

Since the two structural elements, 18 on the left and 20 on the right, are symmetric relative to plane P, only left structural element 18 will be described in detail hereinafter. The pieces of which each structural element 18, 20 is composed will be denoted by identical reference symbols.

Left structural element 18 is provided with a device 21 for adjusting seating element 14 of seat 10, which device is composed in particular of a front coupler 22 and a rear coupler 24, the lower ends of which are mounted via joints so as to rotate around first and second horizontal joint axes A1 and A2, which are composed of pivots fixed on a support 26 of left structural element 18.

Support 26 is disposed facing a slideway 32 of floor 12.

Support 26 of left structural element 18 is provided with a sliding element 34 of known type which is mounted in slideway 32 in order to permit translational movement and adjustment of the longitudinal position of seat 10 along displacement axis X–X'.

The upper ends of each of couplers 22 and 24 are mounted as joints around pivoting axes A3 and A4 respectively, which are composed of pivots carried by seating element 14 of seat 10 and which are situated in substantially horizontal planes perpendicular to axis X–X'.

Figure 2:
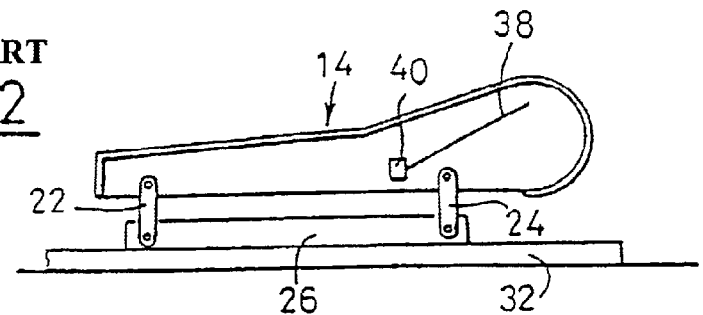
FIG. 2 is a schematic view of a seat similar to that of FIG. 1, illustrated in high position.
Figure 3:
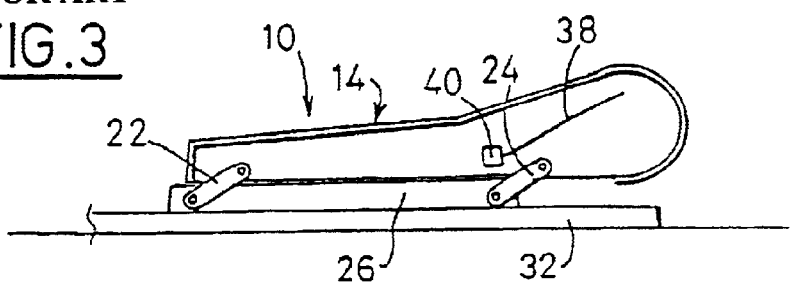
FIG. 3 is a view similar to that of FIG. 2, the seat being illustrated in low position.

Thus front and rear couplers 22 and 24 form together with support 26 and seating element 14 a deformable parallelogram which makes it possible to adjust the height of seating element 14 of seat 10 between a high position illustrated in FIG. 2 and a low position illustrated in FIG. 3.

Each coupler 22 and 24 of left structural element 18 is connected by front and rear transverse connecting tubes 28 and 29 respectively to homologous couplers of right structural element 20. Transverse connecting tubes 28 and 29 are made of a material such as steel.

Couplers 22, 24 are movable between a substantially vertical position and a rearwardly inclined position, corresponding respectively to the high position and to the low position of the seating element of seat 10. This arrangement is advantageous. In fact, for a given positioning of element 26 relative to slideway 32, the low position is that in which seat 10 is the most distant from the front of the vehicle, thus permitting a tall passenger to have maximum space for his legs, which are usually proportional to his height.

Conversely, the high position is that in which seat 10 is closest to the front of the vehicle. Thus it is suitable for shorter passengers, who use this high position and who normally need less space for their legs.

Advantageously, cushioning elements, not illustrated, are situated at the level of the joints of front and rear couplers 22 and 24. They are capable of absorbing the structural vibrations of the vehicle in such a way that the passenger is assured of maximum comfort. The cushioning elements are in particular elastomeric bushings.

Advantageously, one of the pivots of axis A1, A2, A3 or A4 is translationally movable relative to the element in which it is fixed, in such a way that it is possible to adjust the orientation of seating element 14 of seat 10 relative to horizontal floor 12.

In an alternative version, couplers 22 and 24 are replaced by hydraulic thrusters.

The tilting movement of front and rear couplers 22 and 24 around their respective axes is obtained by adjusting means 36, which are arranged on only one side of seat 10.

Adjusting means 36 are provided in particular with a lever 38, which extends toward the front or toward the rear of seat 10. In the illustrated example, it extends toward the rear, while its front end is connected, by welding, for example, or by a clamped joint, to a mechanism 40, which operates a toothed pinion 42 of axis of rotation A5 which cooperates with a toothed sector 44.

Toothed sector 44 is integral with a coupler, for example rear coupler 24, in which case it is centered on axis A4.

According to FIG. 1, lever 38 is situated on the left side of seating element 14, while mechanism 40 is supported by the left upright of seating element 14, in such a way that toothed pinion 42 is mounted inside the seating element, or in other words between the two left and right uprights.

The functioning of adjusting means 36 is as follows.

Figure 4:
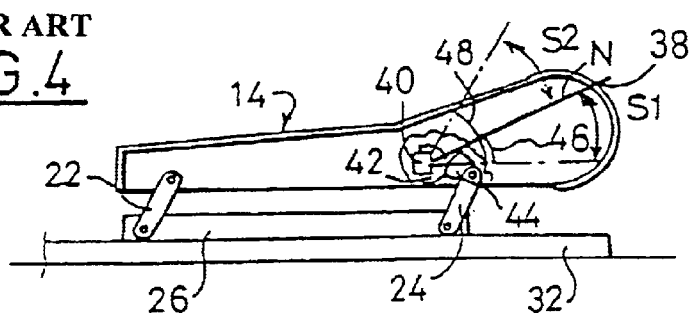
FIG. 4 is a view which represents in detail the movements of the control lever of the seat-adjusting means.

When lever 38 is in neutral position N, as in FIG. 4, mechanism 40 blocks the displacement of seating element 14.

To displace seating element 14 upward, the passenger shifts lever 38 in a first direction S1, illustrated by an arrow, starting from neutral position N, into a first angular sector 46. Mechanism 40 is composed of elements such as catches or disks, of the clutch-disk type, which cause rotation of toothed pinion 42 by a given angle in order to engage with toothed sector 44 and cause counterclockwise rotation of rear coupler 24 relative to axis A4. Lever 38 is then returned to neutral position N, seating element 14 remaining fixed during this return movement. If necessary, this movement is repeated several times until the desired adjustment is obtained for the height of seating element 14.

To displace seating element 14 downward, the passenger shifts lever 38 in a second direction S2, illustrated by an arrow, starting from the neutral position N, into a second angular sector 48. Mechanism 40 then makes it possible to cause rotation of toothed pinion 42 by a given angle to engage sector 44 and cause clockwise rotation of rear coupler 24 relative to axis A4.

In an alternative version, the shifting of lever 38 causes unblocking of toothed sector 42, whereupon seating element 14 moves downward under the weight of the seat and of the passenger. This movement is preferably braked by devices such as a compensating spring.

The rotational movement of left rear coupler 24 of seating element 14 is transmitted to right rear coupler 24 by rear transverse connecting tube 29. In an alternative version, not illustrated, adjusting means 36 are provided with two toothed pinions 42 which are operated simultaneously by mechanism 40 and which engage directly with each toothed sector 44 of the two rear couplers 24.

Regardless of whether the displacement of seating element 14 is upward or downward relative to neutral position N, the first portions of first and second angular sectors 46 and 48 do not cause any displacement of seating element 14. This first portion which, for example, is on the order of 4 to 5°, is referred to as "dead travel" of lever 38, and it permits mechanism 40 to unblock and block the displacement of seating element 14.

Restoring elements, not illustrated, such as a spring or an elastic tongue, ensure that lever 38 is permanently urged toward its neutral position N. Thus, if the passenger shifts the lever into first or second angular sector 46 or 48 without shifting it back again, the restoring elements make it possible to return lever 38 to neutral position N.

Figure 5:
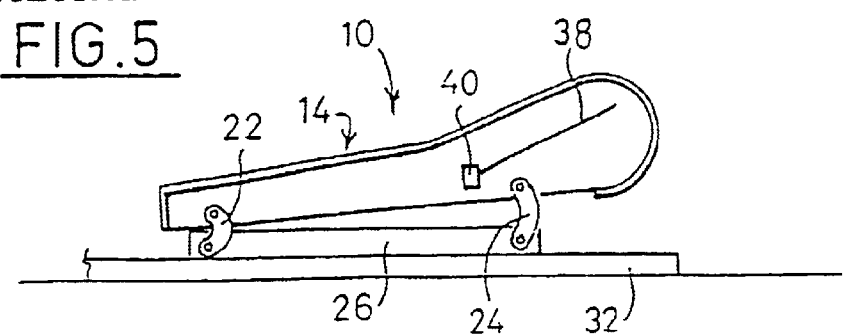
FIG. 5 is a schematic view of the position of the seat according to the prior art when it is subjected to an impact.

During a frontal impact, the adjusting means is subjected to a stress which in particular causes elastic deformation of front coupler 22, as shown in FIG. 5, and also of the cushioning elements situated at the level of the joints of front coupler 22. As a consequence, seating element 14 of seat 10 sinks down toward the front, or in other words seat 10 tilts as a whole around a geometric tilt axis of generally transverse orientation.

For a classical motor-vehicle seat, the sinking effect can reach a value in excess of 40 mm. This deformation does not impart the best comfort to the passenger and, in addition, it does not permit the safety devices, such as an inflatable airbag, to function under the optimal conditions described hereinabove.

Figure 6:
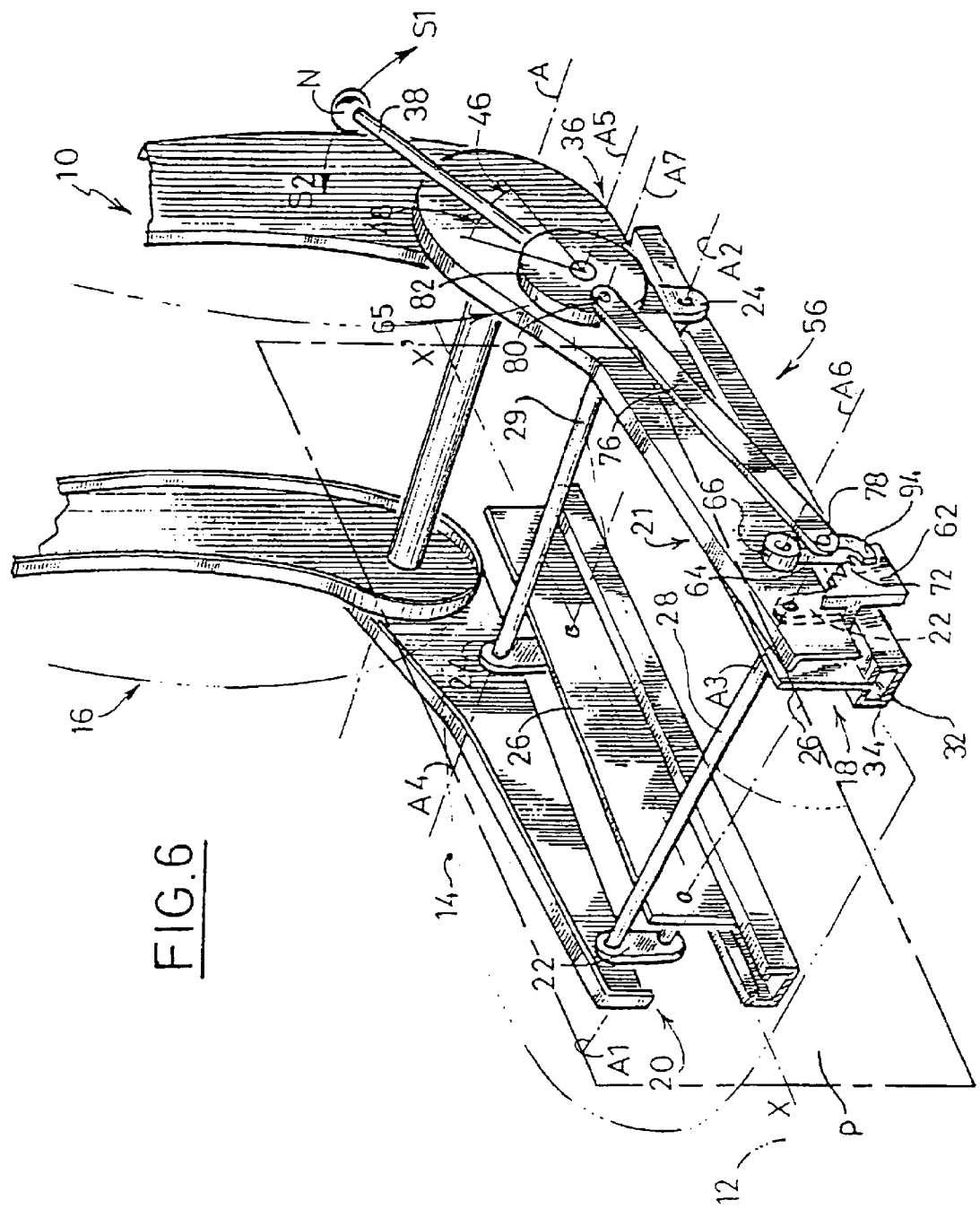
FIG. 6 is a perspective view illustrating a motor-vehicle seat equipped with an energy-absorbing device designed according to the teachings of the invention.

The invention, illustrated in FIG. 6, provides a solution to these problems.

The elements that are identical or similar to those of the prior art will be denoted by the same reference symbols.

According to the invention, reinforcing means 56 are fixed on seating element 14 of seat 10. They make it possible to transfer a large part of the energy resulting from an impact, and especially from a frontal impact of the motor vehicle, from seat 10 to the vehicle structure. Reinforcing means 56 thus make it possible to greatly reduce or even eliminate the deformation of adjusting means 21, and especially of front couplers 22, during a frontal impact. That reduces the tilting of seat 10 and consequently the displacement of the passenger's body relative to the vehicle structure. Thus the passenger's comfort is greatly improved. In addition, it is possible to optimize the position of the safety devices such as an inflatable airbag relative to the position of the passenger's limbs, and especially of his head and his trunk, this position remaining substantially constant regardless of the intensity of the impact.

Reinforcing means 56 are composed of a notched element 62, such as a ratchet-wheel sector integral with support 26, and of a reinforcing leg 64, which is braced on notched element 62 and which is connected to seating element 14 and to a control device 65.

The reinforcing leg 64 has substantially rectangular shape and is oriented substantially vertically. This configuration permits reinforcing leg 64 to transmit maximum energy while having a minimum cross section and therefore reduced weight.

At its upper first end 66, reinforcing leg 64 is mounted via a joint around a transverse pivoting axis A6 in seating element 14 of seat 10, and it pivots around this transverse axis A6 between an engaged reinforcing position in which its lower second end 72 cooperates with notched element 62 and a retracted position in which it permits adjustment of the position of seating element 14.

Control device 65 is composed of a bar 76 of elongated shape. It is mounted to pivot via its front end 78 on leg 64. Its rear end 80 is mounted via a joint around an axis A7 situated eccentrically on a circular element 82 of mechanism 40.

Axis A7 is situated in front of circular element 82, in a horizontal plane that contains axis A5. Thus displacement of lever 38 into first or second angular sectors 46 or 48 causes a rearward displacement of bar 76 and consequently counterclockwise rotation of reinforcing leg 64, which then leaves its engaged position.

Figure 7:
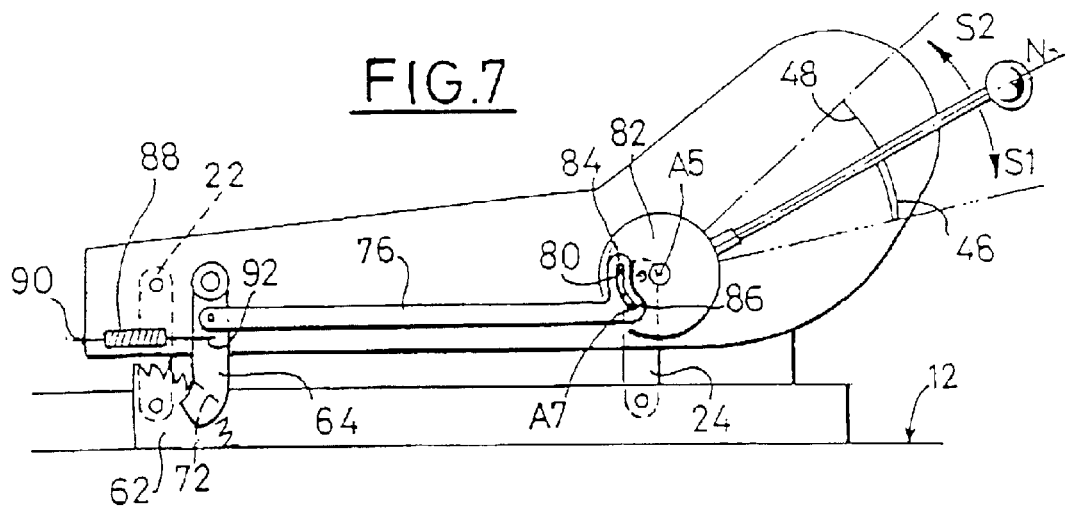
FIG. 7 is a schematic view of a seat similar to that of the preceding figure, the control lever of the adjusting means and of the absorbing device being in neutral position.

According to an alternative version, illustrated schematically in FIG. 7, axis A7 is not situated in the horizontal plane containing axis A5. Rear end 80 of bar 76 of control device 65 is then provided with a slot 84 which cooperates with a pin 86 fixed on circular element 82, thus permitting rotation of reinforcing leg 64 in counterclockwise direction regardless of the direction of displacement of lever 38.

Figure 8:
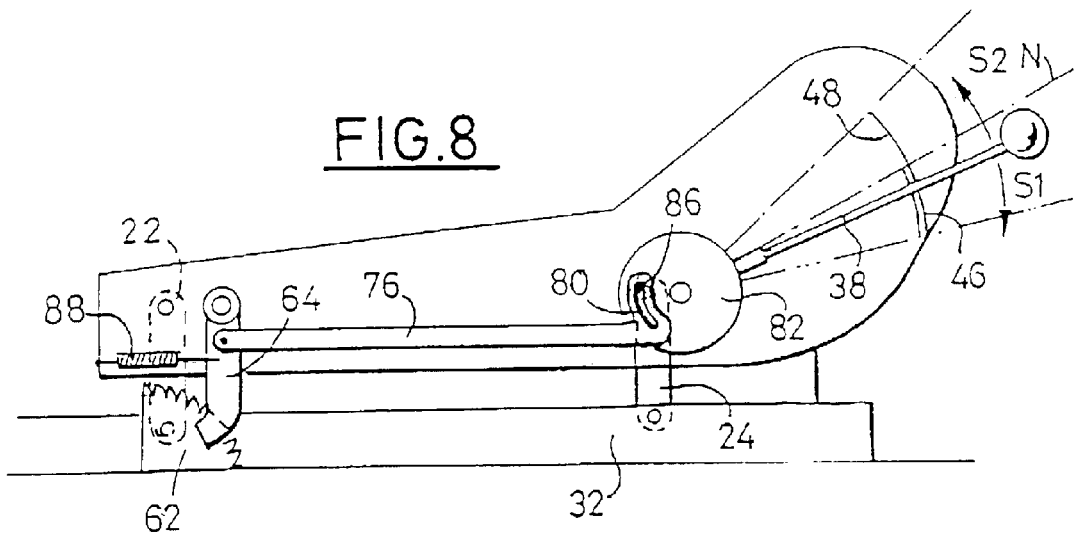
FIG. 8 is a view similar to that of the preceding figure, the control lever being in an intermediate position.

In fact, FIG. 7 illustrates lever 38 in neutral position N. When it is shifted in first direction S1 into first angular sector 46, pin 86 is displaced in slot 84 until it comes into contact with the upper end thereof, as shown in FIG. 8. Continuation of the movement of lever 38 then drives bar 76 toward the rear and thus causes rotation of reinforcing leg 64 toward its retracted position.

Conversely, when lever 38 is shifted in second direction S2 into second angular sector 48, pin 86, now in contact with the lower end of slot 84, drives bar 76 toward the rear and causes rotation of reinforcing leg 64 toward its retracted position.

Figure 9:
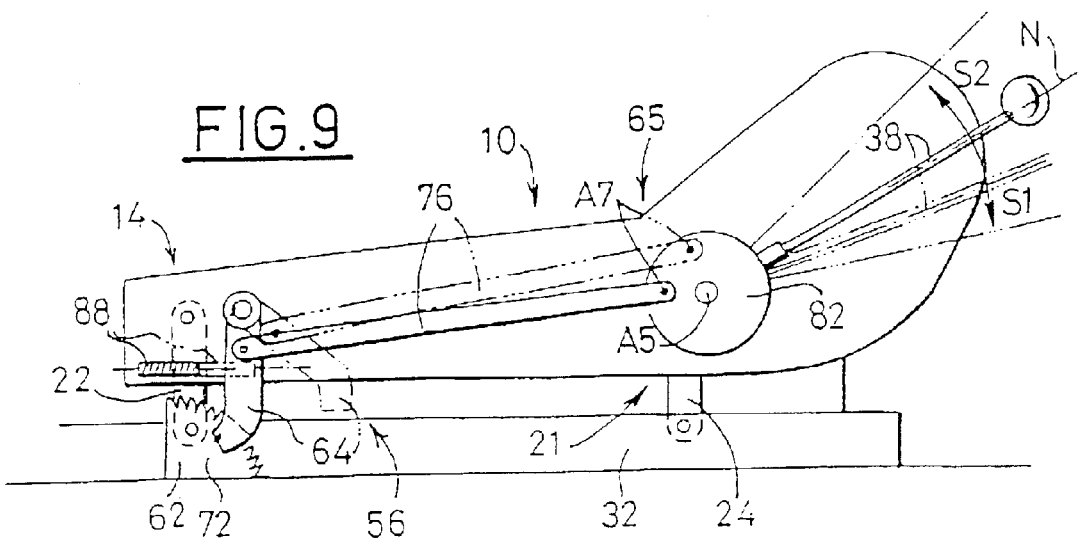
FIG. 9 is a schematic view illustrating the energy-absorbing device in an engaged position and in a retracted position.

As shown in FIG. 9, an elastic restoring element 88 such as a draw spring is provided with a front first end 90, which is fixed at the front of seating element 14 of seat 10, and with a second rear end 92, which is connected close to second end 72 of reinforcing leg 64.

Elastic restoring element 88 makes it possible to exert on reinforcing leg 64 a force toward the front, thus tending to maintain second end 72 of reinforcing leg 64 in contact with notched element 62. It makes it possible on the one hand to ensure return of reinforcing leg 64 to engaged position and on the other hand to prevent reinforcing leg 64, under the influence of vibrations, from rattling against notched element 62 and thus producing an annoying noise.

The functioning of adjusting device 21 and of reinforcing means 56 is as follows.

As shown in FIG. 9, when lever 38 is in neutral position N, illustrated by solid lines, the position of seating element 14 of seat 10 is blocked and reinforcing leg 64 is positioned such that it is engaged with notched element 62. Thus, when an impact occurs, and especially a frontal impact, the quasi-totality of the forces generated by the passenger and seat 10 are transmitted to the vehicle structure via reinforcing leg 64 and notched element 62. The deformations of adjusting device 21 are then greatly reduced.

The forces generated by the impact are sometimes very intense. To prevent any risks of sliding of second lower end 72 of reinforcing leg 64 relative to notched element 62, two cheek plates 94 are added on both sides of second end 72. The two cheek plates 94 then prevent transverse translational movement of second end 72 relative to notched element 62.

During adjustment of the height of seating element 14 of seat 10, the passenger shifts lever 38 in first or second direction S1 or S2, as shown in FIG. 9, depending on whether the seating element is to be raised or lowered.

During the first degrees of rotation of lever 38, control device 65 causes counterclockwise rotation of reinforcing leg 64 from its engaged position, illustrated in solid lines, toward its retracted position, illustrated in broken lines.

Thus, at the end of the "dead travel" of lever 38, second end 72 of reinforcing leg 64 is no longer braced against notched element 62, and adjusting device 21 is unblocked.

Continuation of the displacement of lever 38 then causes seating element 14 to be raised or lowered.

When lever 38 returns to its neutral position N, mechanism 40 blocks the displacement of seating element 14, after which, in the course of the "dead travel", reinforcing leg 64 resumes its engaged position.

Thus the use of reinforcing means 56 is "transparent" for the user. Whenever lever 38 is shifted over an angular sector greater than its "dead travel", mechanism 40 unblocks the displacement of seating element 14 after reinforcing leg 64 has left its engaged position.

The invention makes it possible to improve the comfort of the passengers and to optimize their safety in the event of impact. In addition, since the only function of front and rear couplers 22 and 24 is to adjust the seating element of seat 24, and is no longer to support the latter during an impact, their size can be greatly reduced.

The foregoing description is not limitative with respect to the invention. In fact, reinforcing means 56 can be symmetric relative to plane P. They are then provided with two reinforcing legs 64, which are situated on both sides of seating element 14 of seat 10 and which are operated simultaneously. In addition, adjusting means 36 can be composed, for example, of a knurled-wheel control device, the transverse displacement of which permits on the one hand blocking and unblocking of the displacement of seating element 14, and on the other hand the passage of reinforcing leg 64 from its engaged position to its retracted position, while the rotation of which permits adjustment of the height of seating element 14.

What is claimed is:

1. An adjustable seat for a motor vehicle, comprising:
   a substantially horizontal seating element, on a rear part of which is mounted a back by a joint;
   an adjusting device for adjustment of a position of the seating element of the seat relative to a structure of the vehicle;
   means for blocking and unblocking the adjusting device; and
   reinforcing means separate from the adjusting device and which, during a longitudinal impact, absorbs at least part of collision forces caused by the impact, reducing deformation of the adjusting device and reducing tilting movement of the adjustable seat around a geometric tilt axis of generally transverse orientation,
   wherein the reinforcing means is provided with at least one reinforcing leg, mounted to rotate by a first end around a transverse pivoting axis in the seating element of the seat, and that pivots around the transverse pivoting axis between an engaged reinforcing position, in which a second end cooperates with the vehicle structure, and a retracted position configured to permit adjustment of the position of the seating element.

2. An adjustable seat according to claim 1, wherein a pivoting axis of an upper end of the reinforcing leg is mounted in a front part of the seating element of the seat.

3. An adjustable seat according to claim 1, wherein the reinforcing leg is mounted by a joint on a lateral element of the seating element of the seat of the vehicle.

4. An adjustable seat according to claim 1, wherein the reinforcing means are symmetric and are provided with two reinforcing legs that are operated simultaneously.

5. An adjustable seat according to claim 1, wherein the second end of the reinforcing leg cooperates with a notched element integral with the vehicle structure, to define the engaged position.

6. An adjustable seat according to claim 1, wherein the reinforcing leg is restored elastically to the engaged position.

7. An adjustable seat according to claim 1, wherein the reinforcing leg is connected to a control device for control of the pivoting of the reinforcing leg between its engaged and retracted positions.

8. An adjustable seat according to claim 7, wherein the control device is provided with a bar connected to the reinforcing leg in a zone situated between the pivoting axis and the second end, and displacement of the bar permits pivoting of the reinforcing leg around the pivoting axis, between its engaged position and its retracted position.

9. An adjustable seat according to claim 8, wherein the control device is actuated by the means for blocking and unblocking the adjusting device.

10. An adjustable seat according to claim 9, wherein, during unblocking of the adjusting device, the reinforcing leg is in the retracted position before the adjusting device is unblocked.

11. An adjustable seat for a motor vehicle, comprising:
    a substantially horizontal seating element, on a rear part of which is mounted a back by a joint;
    an adjusting device for adjustment of a position of the seating element of the seat relative to a structure of the vehicle;
    means for blocking and unblocking the adjusting device; and
    reinforcing means separate from the adjusting device and which, during a longitudinal impact, absorbs at least part of collision forces caused by the impact, reducing deformation of the adjusting device and reducing tilting movement of the adjustable seat around a geometric tilt axis of generally transverse orientation,
    wherein the adjusting device for adjustment of the position of the seating element of the seat comprises two front couplers and two rear couplers.

12. An adjustable seat for a motor vehicle, comprising:
    a substantially horizontal seating element, on a rear part of which is mounted a back by a joint;
    an adjusting device for adjustment of a position of the seating element of the seat relative to a structure of the vehicle;
    means for blocking and unblocking the adjusting device; and
    a reinforcing leg separate from the adjusting device and configured to engage the seating element to a notched element integral with the structure of the vehicle.

13. An adjustable seat for a motor vehicle, comprising:
    a substantially horizontal seating element, on a rear part of which is mounted a back by a joint;
    an adjusting device for adjustment of a position of the seating element of the seat relative to a structure of the vehicle;
    means for blocking and unblocking the adjusting device; and
    reinforcing means separate from the adjusting device and which, during a longitudinal impact, absorbs at least part of collision forces caused by the impact, reducing deformation of the adjusting device and reducing tilting movement of the adjustable seat around a geometric tilt axis of generally transverse orientation.

* * * * *